United States Patent
Chou et al.

(10) Patent No.: US 11,972,055 B2
(45) Date of Patent: Apr. 30, 2024

(54) ELECTRONIC DEVICE WITH VIBRATION FUNCTION AND VIBRATION DRIVING METHOD

(71) Applicant: ASUSTeK COMPUTER INC., Taipei (TW)

(72) Inventors: Ta Chun Chou, Taipei (TW); Chih kun Chuang, Taipei (TW); Chia Yuan Wu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/959,312

(22) Filed: Oct. 4, 2022

(65) Prior Publication Data
US 2023/0134411 A1    May 4, 2023

(30) Foreign Application Priority Data
Oct. 28, 2021    (TW) .................. 110140057

(51) Int. Cl.
*G06F 3/16*    (2006.01)
*G06F 3/01*    (2006.01)

(52) U.S. Cl.
CPC .............. *G06F 3/016* (2013.01); *G06F 3/165* (2013.01)

(58) Field of Classification Search
None
See application file for complete search history.

(56) References Cited

U.S. PATENT DOCUMENTS

| | | | |
|---|---|---|---|
| 2017/0092084 A1* | 3/2017 | Rihn | G06F 3/167 |
| 2018/0061195 A1* | 3/2018 | Rihn | G08B 6/00 |
| 2020/0004337 A1* | 1/2020 | Hendren | G06F 1/1616 |
| 2020/0334963 A1* | 10/2020 | Yokoyama | G06F 3/01 |

FOREIGN PATENT DOCUMENTS

| | | |
|---|---|---|
| CN | 101661305 | 3/2010 |
| CN | 106126184 | 4/2019 |
| TW | M568419 | 10/2018 |
| TW | 202042051 | 11/2020 |
| TW | M605314 | 12/2020 |

* cited by examiner

*Primary Examiner* — Carl Adams
(74) *Attorney, Agent, or Firm* — JCIPRNET

(57) ABSTRACT

The disclosure provides an electronic device with a vibration function and a vibration driving method. The electronic device includes a processor and an audio player. The processor outputs an audio signal according to an application program, and executes an audio analysis module to analyze the audio signal. The audio player is coupled to the processor, and receives the audio signal. When the audio analysis module determines that the audio signal has a loudness with an audio frequency lower than a default frequency threshold according to an audio frequency distribution of the audio signal, the audio analysis module outputs a vibration drive signal according to the loudness of the audio signal.

17 Claims, 5 Drawing Sheets

ELECTRONIC DEVICE WITH VIBRATION FUNCTION AND VIBRATION DRIVING METHOD

CROSS-REFERENCE TO RELATED APPLICATION

This application claims the priority benefit of Taiwan Application Serial No. 110140057, filed on Oct. 28, 2021. The entirety of the above-mentioned patent application is hereby incorporated by reference herein and made a part of the specification.

BACKGROUND OF THE INVENTION

Field of the Invention

The disclosure relates to an electronic device with a vibration function and a vibration driving method.

Description of the Related Art

Traditional electronic devices, such as notebook computers or tablet computers, only perform special design and configurations for acousto-optic effects, but fail to provide a special tactile sensation. Therefore, the somatosensory experience provided by the traditional electronic devices is limited. Moreover, when the user is a hearing-impaired person, because he cannot perceive the current usage status or sound effects from sounds, the hearing-impaired user may have a poor user experience when using the traditional electronic devices.

BRIEF SUMMARY OF THE INVENTION

According to the first aspect of the disclosure, an electronic device with a vibration function is provided. The electronic device includes a processor and an audio player. The processor outputs an audio signal according to an application program, and executes an audio analysis module to analyze the audio signal. The audio player is coupled to the processor, and receives the audio signal. When the audio analysis module determines that the audio signal has a loudness with an audio frequency lower than a default frequency threshold according to an audio frequency distribution of the audio signal, the audio analysis module outputs a vibration drive signal according to the loudness of the audio signal.

According to the second aspect of the disclosure, a vibration driving method includes the following steps: outputting an audio signal to an audio player according to an application program; executing an audio analysis module to analyze the audio signal; determining, by the audio analysis module, whether the audio signal has a loudness with an audio frequency lower than a default frequency threshold according to an audio frequency distribution of the audio signal; and outputting, by the audio analysis module, a vibration drive signal according to the loudness of the audio signal, when the audio analysis module determines that the audio signal has the loudness with an audio frequency lower than the default frequency threshold.

Based on the foregoing, the electronic device with a vibration function and the vibration driving method of the disclosure may generate a corresponding vibration effect according to a change of the audio frequency of the audio signal.

To make the features and advantages of the disclosure clear and easy to understand, the following gives a detailed description of embodiments with reference to accompanying drawings.

DETAILED DESCRIPTION OF THE EMBODIMENTS

Figure 1:
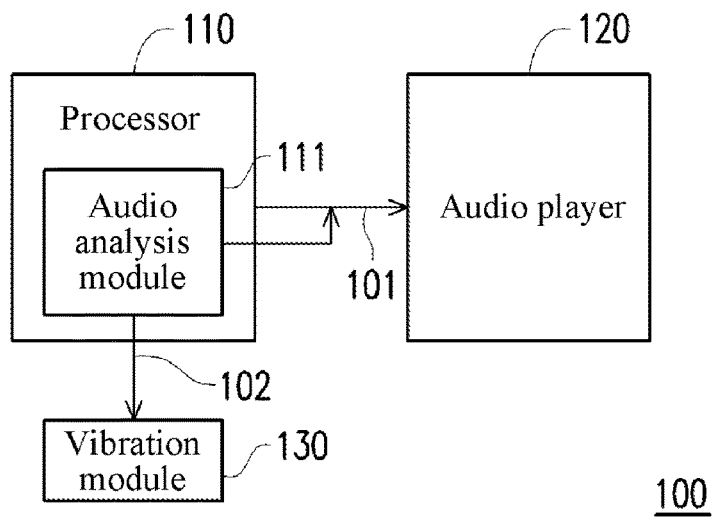
FIG. 1 is a schematic circuit diagram of an electronic device according to an embodiment of the disclosure.

To make the content of the disclosure more comprehensible, embodiments are described below as examples according to which the disclosure can indeed be implemented. In addition, wherever possible, components/structures/steps with same reference numerals in the drawings and implementations represent same or similar parts.

Referring to FIG. 1, an electronic device 100 includes a processor 110 and an audio player 120. The processor 110 is coupled to the audio player 120. In this embodiment, the processor 110 outputs an audio signal 101 to the audio player 120, and executes an audio analysis module 111 to monitor the audio signal 101. The audio analysis module 111 outputs a corresponding vibration drive signal 102 according to an analysis result of the audio signal 101. Specifically, in an embodiment, the processor 110 executes an application program, such as a game program or a movie player program, but the disclosure is not limited thereto. When the application program outputs a specific audio corresponding to an effect with an audio frequency that is a low frequency during execution, the audio signal 101 output by the processor 110 has corresponding loudness information of the audio frequency. In an embodiment, the specific audio refers to an explosion sound, a collision sound, a specific sound effect, or the like, but the disclosure is not limited thereto. Therefore, the audio analysis module 111 of this embodiment monitors and analyzes a change of the audio frequency of the audio signal 101 in real time, so as to output the corresponding vibration drive signal 102 to a built-in or external vibration module 130 of the electronic device 100 in real time to provide a real-time vibration effect, so that the user obtains a corresponding somatosensory experience with a corresponding tactile sensation.

In this embodiment, the electronic device 100 is a notebook computer, a tablet computer, a smartphone, a gamepad, or the like in an embodiment, but the disclosure is not limited thereto. In this embodiment, the processor 110 is a central processing unit (CPU), a microprocessor control unit (MCU), a field-programmable gate array (FPGA), or other processing circuits or control circuits in an embodiment, but the disclosure is not limited thereto. The electronic device 100 further includes a memory, used to store the audio analysis module 111 and other application programs. The processor 110 is coupled to the memory, and the processor 110 accesses and executes data or an algorithm of the audio analysis module 111 and other application programs in the memory. In this embodiment, the audio player 120 includes a sound card, and the sound card receives the audio signal 101 to drive a built-in or external horn device of the electronic device 100. In addition, in other embodiments of the disclosure, the audio analysis module 111 is further implemented by a separate circuit with firmware or software, and is driven by the processor 110 to perform the audio signal analysis function.

Figure 2:
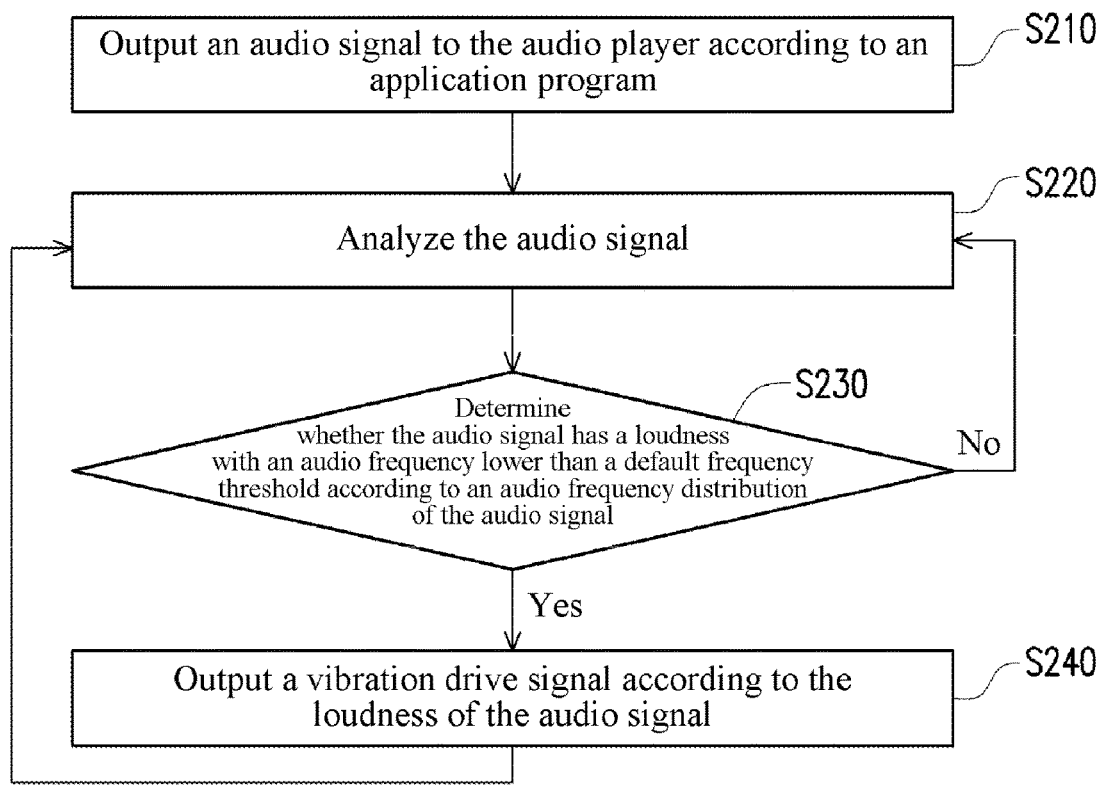
FIG. 2 is a flowchart of a vibration driving method according to an embodiment of the disclosure.
Figure 3:
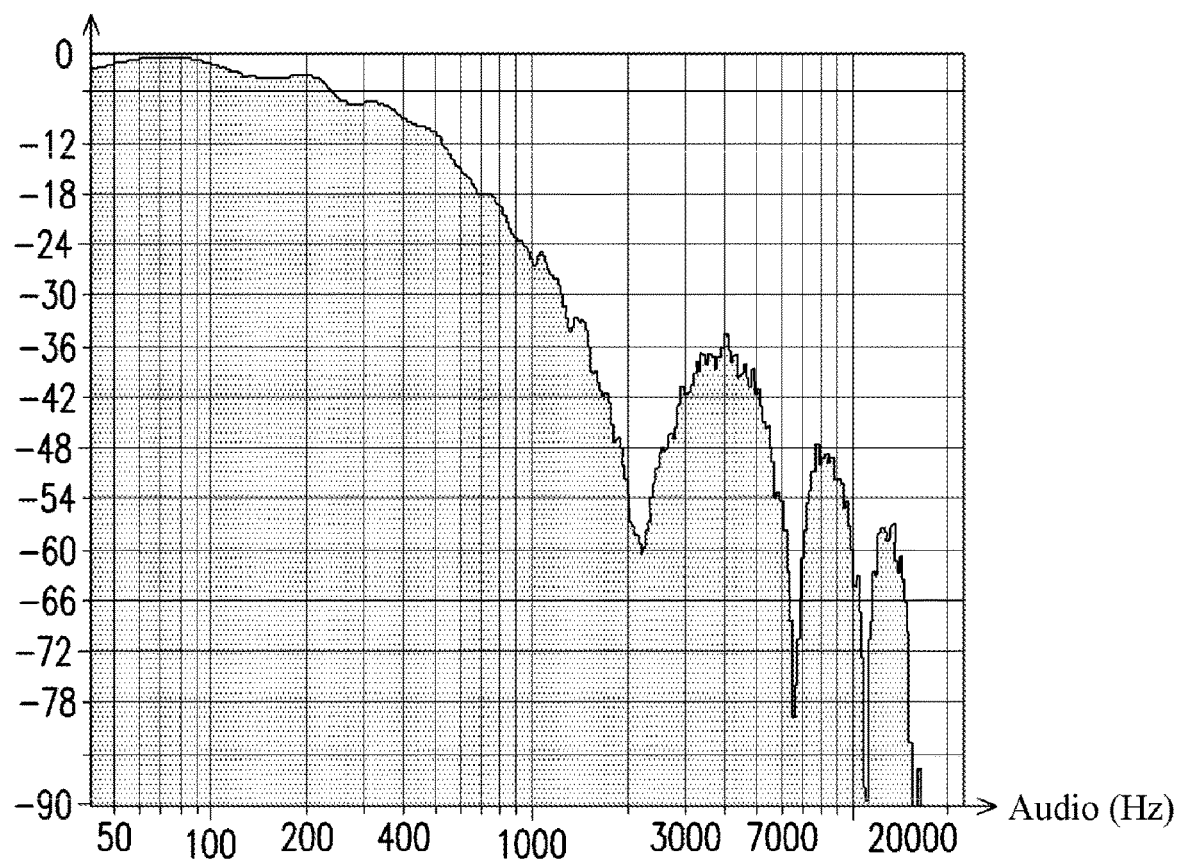
FIG. 3 is a schematic diagram of an audio frequency distribution according to an embodiment of the disclosure.

Referring to FIG. 1 to FIG. 3, in an embodiment, the electronic device 100 performs the following steps S210 to S240 to achieve a vibration effect. In step S210, the processor 110 outputs the audio signal 101 to the audio player 120. In step S220, the processor 110 executes the audio analysis module 111 to analyze the audio signal 101. In step S230, the processor 110 executes the audio analysis module 111 to determine whether the audio signal 101 has a loudness with an audio frequency lower than a default frequency threshold according to an audio frequency distribution of the audio signal 101. If not, the processor 110 performs step S220 to continue monitoring the processor 110. If so, the processor 110 performs step S240. In step S240, the audio analysis module 111 outputs the vibration drive signal 102 according to the loudness of the audio signal 101. Next, the processor 110 performs step S220 to continuously monitor the processor 110.

In an embodiment, when audio content is an explosion sound, at a certain time point, the audio content provided by the audio signal 101 has an audio frequency distribution result as shown in FIG. 3. As shown in FIG. 3, in an embodiment, a range of an audio frequency with a loudness is 0 to 20,000 Hz, and the loudness is 0 to −90 dB. In this regard, the default frequency threshold is 500 Hz in an embodiment. Therefore, when the audio analysis module 111 detects that the audio signal 101 has a loudness with an audio frequency lower than the default frequency threshold as shown in FIG. 3 at this time point, the audio analysis module 111 outputs, the vibration drive signal 102 in real time. In addition, the audio analysis module 111 determines corresponding vibration intensity information in the vibration drive signal 102 according to the loudness of the audio signal 101.

In this regard, the audio analysis module 111 determines the corresponding vibration intensity information in the vibration drive signal 102 according to an average loudness of multiple loudnesses corresponding to a current overall audio frequency (in an embodiment, 0 to 20,000 Hz) of the audio signal 101. Alternatively, the audio analysis module 111 determines the corresponding vibration intensity information in the vibration drive signal 102 according to an average loudness of multiple loudnesses corresponding to the partial audio frequency of the audio signal 101 (in an embodiment, 0 to 500 Hz) currently lower than the default frequency threshold. Alternatively, </pt154> the audio analysis module 111 determines the corresponding vibration intensity information in the vibration drive signal 102 according to a loudness corresponding to an audio frequency of the audio signal 101 (in an embodiment, 450 Hz) currently lower than the default frequency threshold.

In this way, when the built-in or external vibration module 130 of the electronic device 100 receives the vibration drive signal 102, the vibration module 130 provides a corresponding vibration effect in real time with the audio (an explosion sound) at that time, and the vibration intensity and/or vibration frequency of the vibration module 130 is positively correlated with the loudness. Therefore, the vibration driving method and the electronic device 100 of this embodiment manage to provide a vibration function with a good somatosensory experience effect.

In some embodiments, the processor 110 executes other application programs, and when a specific event of the application programs occurs, the application program outputs a message signal. The audio analysis module 111 determines whether to output another vibration drive signal to the built-in or external vibration module 130 of the electronic device 100 according to the message signal. In an embodiment, when a power management module executed by the processor 110 detects that the power is low, the power management module outputs a power warning message signal, and the audio analysis module 111 outputs another vibration drive signal to the built-in or external vibration module 130 of the electronic device 100 according to the power warning message signal, so as to alert the user through a vibration effect. In an embodiment, when an e-mail management module executed by the processor 110 receives a new email, the e-mail management module outputs a letter alert message signal. The audio analysis module 111 outputs another vibration drive signal to the built-in or external vibration module 130 of the electronic device 100 according to the letter alert message signal, so as to alert the user through a vibration effect.

Figure 4:
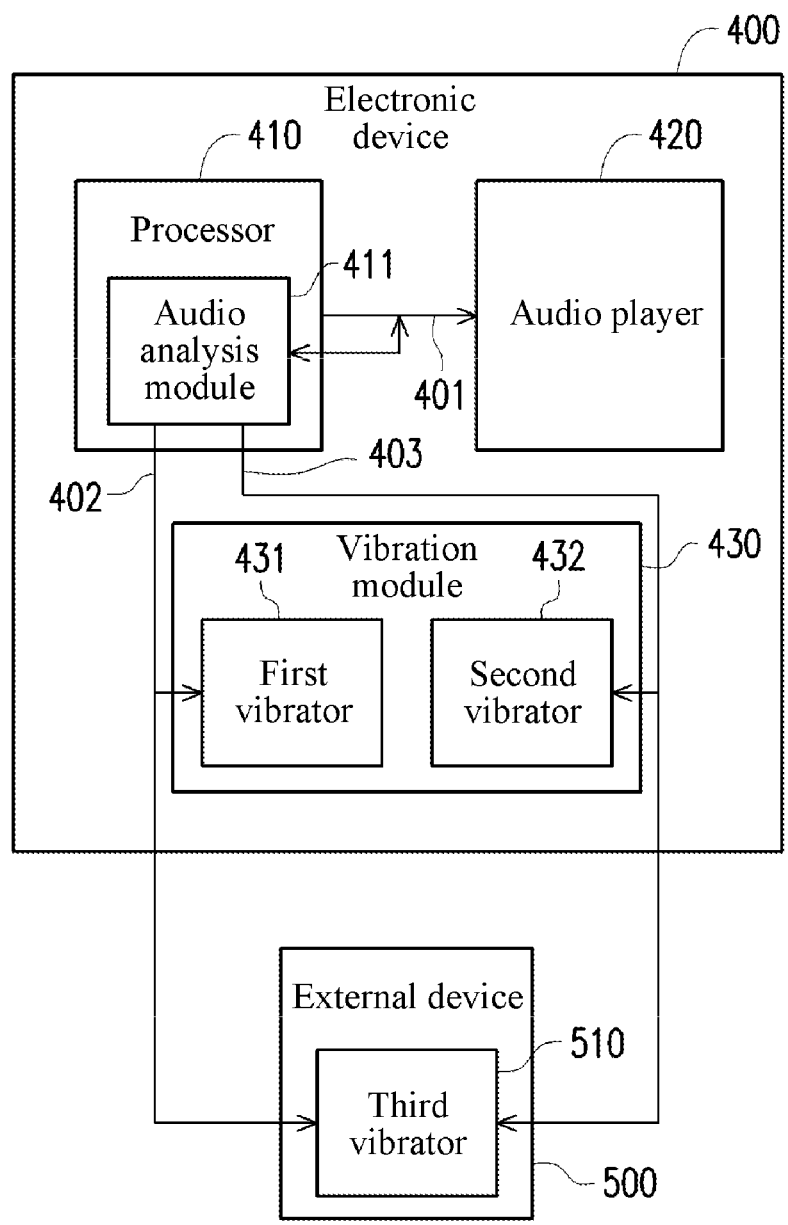
FIG. 4 is a schematic diagram of an electronic device according to another embodiment of the disclosure.

Referring to FIG. 4, an electronic device 400 includes a processor 410, an audio player 420, and a vibration module 430. The processor 410 is coupled to the audio player 420 and the vibration module 430. The vibration module 430 includes a first vibrator 431 and a second vibrator 432. In addition, the processor 410 is further coupled to an external device 500 disposed outside the electronic device 400. The external device 500 includes a third vibrator 510. In this embodiment, the processor 410 outputs an audio signal 401 to the audio player 420, and executes an audio analysis module 411 to monitor the audio signal 401. The audio analysis module 411 outputs at least one of a corresponding first vibration drive signal 402 and second vibration drive signal 403 according to an analysis result of the audio signal 401.

In an embodiment, the audio signal 401 includes a left channel signal and a right channel signal, and individually analyzes whether the left channel signal and the right channel signal have conditions to trigger a vibration effect, so as to determine whether to output at least one of the first vibration drive signal 402 and the second vibration drive signal 403. In this embodiment, the first vibrator 431 is disposed in a left-side position of the electronic device 400, and the second vibrator 432 is disposed in a right-side position of the electronic device 400. In this regard, the audio analysis module 411 drives at least one of the first vibrator 431, the second vibrator 432, and the third vibrator 510 of the external device 500 by outputting at least one of the first vibration drive signal 402 and the second vibration drive signal 403.

In addition, technical details and implementations related to the processor 410 and the audio player 420 of this embodiment can be sufficiently taught, suggested and implemented with reference to the description of the embodiments in FIG. 1 to FIG. 3, and thus details are not described herein.

Figure 5:
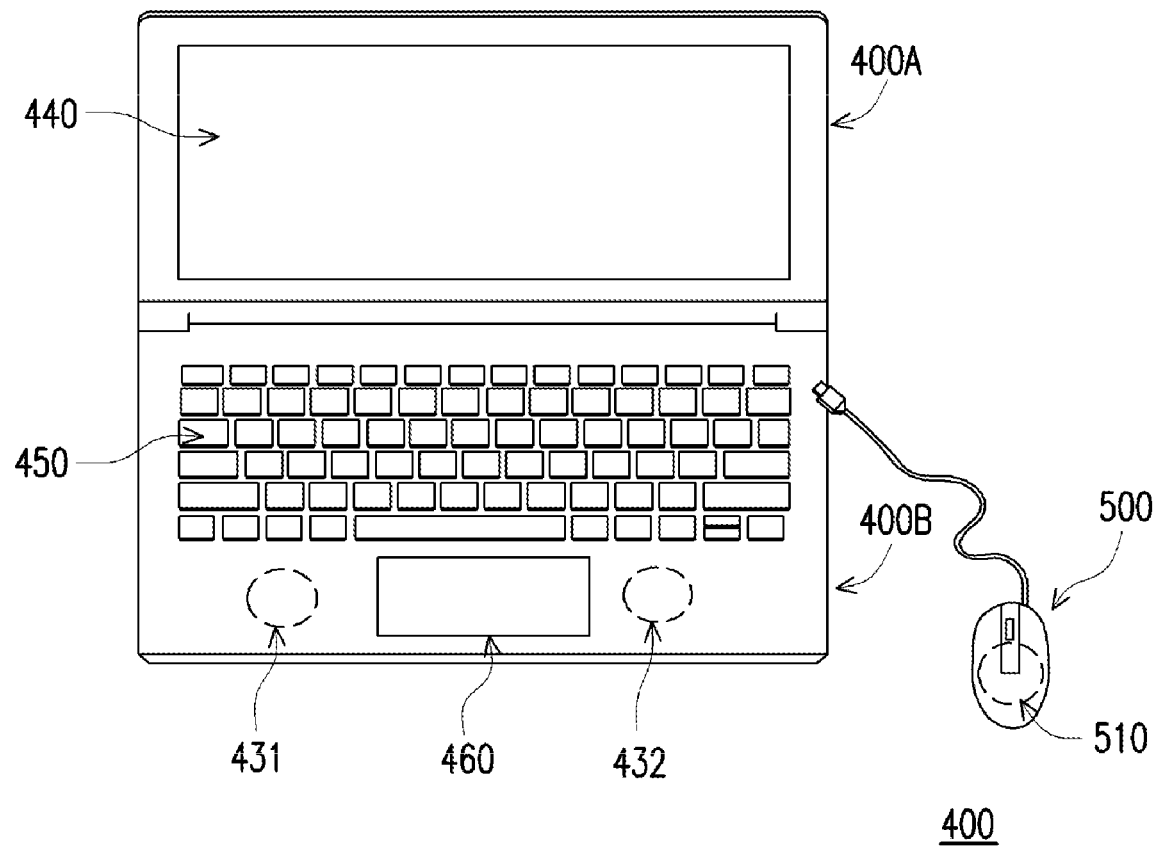
FIG. 5 is a schematic diagram of an electronic device according to an embodiment of the disclosure.

Referring to FIG. 4 and FIG. 5, in an embodiment, the electronic device 400 is a notebook computer, and the external device 500 is a mouse. The electronic device 400 has a first body 400A and a second body 400B. The electronic device 400 further includes a display module 440 disposed on the first body 400A. The display module 440 includes a display panel and an associated display drive circuit. The electronic device 400 further includes a first input module 450 and a second input module 460. The first input module 450 includes a keyboard in an embodiment. The second input module 460 includes a touch panel or a handwriting panel in an embodiment. In this embodiment, the first vibrator 431 is disposed on a left side of the second input module 460 of the electronic device 400 (inside a housing of the second body 400B), and the second vibrator 432 is disposed on a right side of the second input module 460 of the electronic device 400 (inside the housing of the second body 400B). Alternatively, in another embodiment of the disclosure, the first vibrator 431 is disposed on a left side of the first input module 450 of the electronic device 400. The second vibrator 432 is disposed on a right side of the first input module 450 of the electronic device 400. In this embodiment, the third vibrator 510 is disposed in the external device 500 (inside the mouse).

In this way, when operating the electronic device 400 and the external device 500, the user places the left hand (in an embodiment, the left wrist and/or part of the left palm) or the right hand (in an embodiment, the right wrist and/or part of the right palm) on the second body 400B of the electronic device 400 and on the left or right side of the second input module 460, so as to feel a vibration effect provided by the first vibrator 431 and the second vibrator 432. In addition, the user places the left hand (in an embodiment, part of the fingers of the left hand and/or part of the left palm) or the right hand (in an embodiment, part of the fingers of the right hand and/or part of the right palm) on the external device 500, so as to feel a vibration effect provided by the third vibrator 510.

Figure 6:
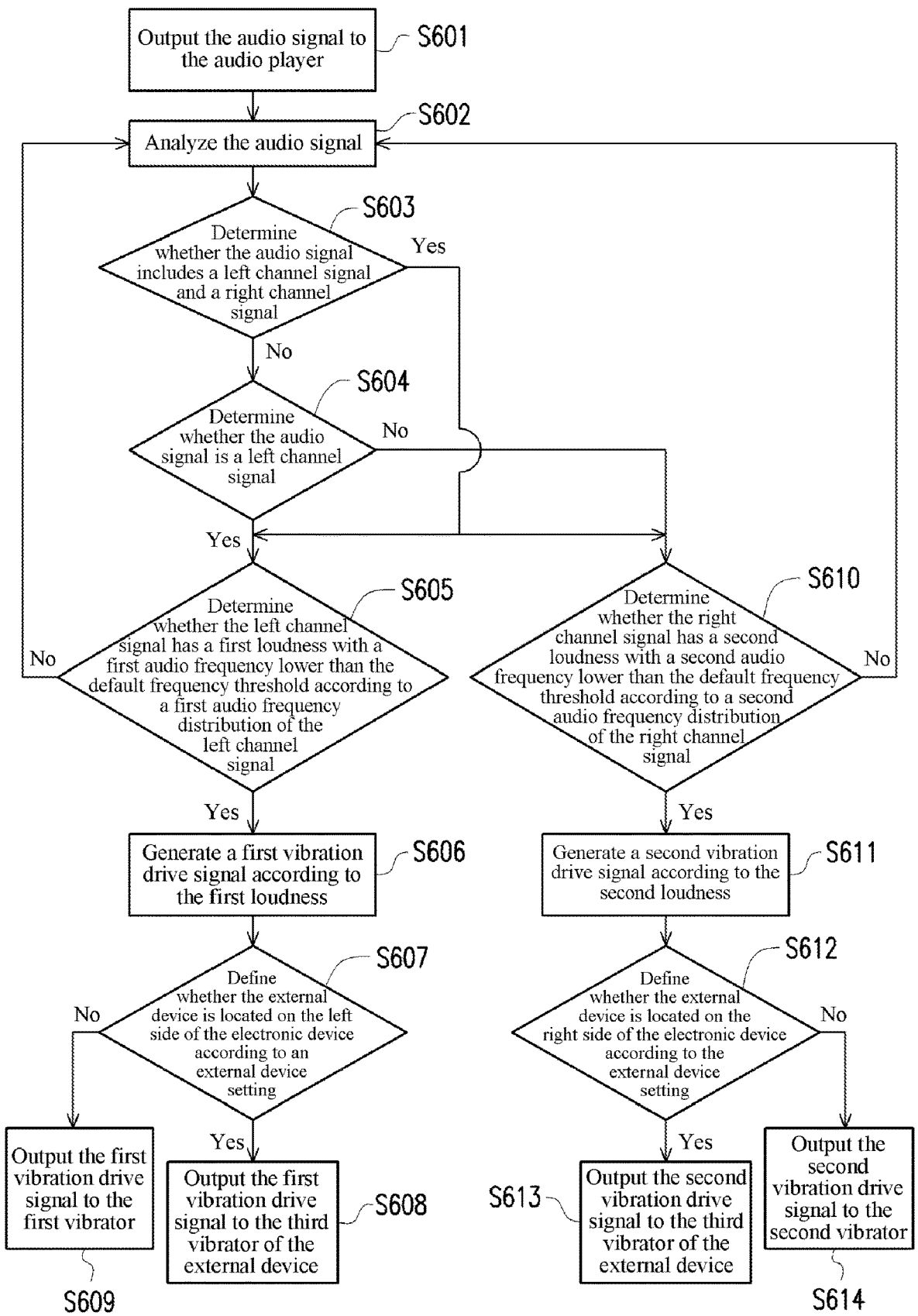
FIG. 6 is a flowchart of a vibration driving method according to another embodiment of the disclosure.

Referring to FIG. 4 to FIG. 6, the electronic device 400 performs the following steps S601 to S614 in an embodiment, to achieve a vibration effect. In step S601, the processor 410 outputs the audio signal 401 to the audio player 420. In step S602, the processor 410 executes the audio analysis module 411 to analyze the audio signal 401. In step S603, the processor 410 determines whether the audio signal 401 includes a left channel signal and a right channel signal. If not, the processor 410 performs step S604. If so, the processor 410 performs step S605 and step S610. In step S604, the processor 410 executes the audio analysis module 411 to determine whether the audio signal 401 is a left channel signal. If not, the processor 410 performs step S610. If so, the processor 410 performs step S605.

In step S605, the processor 410 executes the audio analysis module 411 to determine whether the left channel signal has a first loudness with a first audio frequency lower than a default frequency threshold according to a first audio frequency distribution of the left channel signal. If not, the processor 410 performs step S602 to continuously monitor the audio signal 401. If so, the processor 410 performs step S606. In step S606, the processor 410 executes the audio analysis module 411 to generate the first vibration drive signal 402 according to the first loudness. In step S607, the processor 410 executes the audio analysis module 411 to define whether the external device 500 is located on the left side of the electronic device 400 according to an external device setting. If so, the processor 410 performs step S608. If not, the processor 410 performs step S609. In step S608, the processor 410 executes the audio analysis module 411 to output the first vibration drive signal 402 to the third vibrator 510 of the external device 500. In step S609, the processor 410 executes the audio analysis module 411 to output the first vibration drive signal 402 to the first vibrator 431.

In other words, when the mouse is located on the left side of the electronic device 400, it indicates that the user's left hand is placed on the mouse. Therefore, the processor 410 drives the third vibrator 510 of the external device 500 to enable the user to feel a vibration effect corresponding to the left channel signal. Conversely, when the mouse is located on the right side of the electronic device 400, it indicates that the user's left hand is placed on the second body 400B of the electronic device 400, in an embodiment, on the left side of the keyboard or touch panel. Therefore, the processor 410 drives the first vibrator 431 to enable the user to feel a vibration effect corresponding to the left channel signal. In addition, regarding the external device setting of this embodiment, the external device setting means that the user performs a setting operation in an operation system performed by the processor 410 in advance, so as to designate the use orientation of the mouse to be the left or right side of the electronic device 400.

In step S610, the processor 410 executes the audio analysis module 411 to determine whether the right channel signal has a second loudness with a second audio frequency lower than the default frequency threshold according to a second audio frequency distribution of the right channel signal. If not, the processor 410 performs step S602 to continuously monitor the audio signal 401. If so, the processor 410 performs step S611. In step S611, the processor 410 executes the audio analysis module 411 to generate the second vibration drive signal 403 according to the second loudness. In step S612, the processor 410 executes the audio analysis module 411 to define whether the external device 500 is located on the right side of the electronic device 400 according to the external device setting. If so, the processor 410 performs step S613. If not, the processor 410 performs step S614. In step S613, the processor 410 executes the audio analysis module 411 to output the second vibration drive signal 403 to the third vibrator 510 of the external device 500. In step S614, the processor 410 executes the audio analysis module 411 to output the second vibration drive signal 403 to the second vibrator 432.

In other words, when the mouse is located on the right side of the electronic device 400, it indicates that the user's right hand is placed on the mouse. Therefore, the processor 410 drives the third vibrator 510 of the external device 500 to enable the user to feel a vibration effect corresponding to the right channel signal. Conversely, when the mouse is located on the left side of the electronic device 400, it indicates that the user's right hand is placed on the second body 400B of the electronic device 400, in an embodiment, on the right side of the keyboard or touch panel. Therefore, the processor 410 drives the second vibrator 432 to enable the user to feel a vibration effect corresponding to the right channel signal.

It should be noted that, in step S603, when the processor 410 determines that the audio signal 401 includes both the left channel signal and the right channel signal, the processor 410 performs step S605 and step S610 to respectively determine whether the left channel signal and the right channel signal have conditions to trigger a vibration effect. If so, the processor 410 simultaneously drives either the first vibrator 431 or the second vibrator 432 and the third vibrator 510. If not, the processor 410 drives one of the first vibrator 431, the second vibrator 432, and the third vibrator 510. Therefore, the vibration driving method and the electronic device 400 of this embodiment provide a vibration function with a good somatosensory experience effect.

In summary, the electronic device with a vibration function and the vibration driving method of the disclosure trigger a vibration effect in real time according to a change of an audio frequency of an audio signal, and are further matched with different audio effects of a left channel and a right channel to provide the vibration effect in different positions of the electronic device. In addition, the electronic device with a vibration function and the vibration driving method of the disclosure are further matched with a setting position or usage mode of an external device with a vibrator to correspondingly adjust the position providing a vibration effect. Therefore, the electronic device with a vibration function and the vibration driving method of the disclosure provide a vibration effect with good somatosensory experience.

Although the disclosure has been described with reference to the above embodiments, the embodiments are not intended to limit the disclosure. A person of ordinary skill in the art is able to make variations and improvements without departing from the spirit and scope of the disclosure. Therefore, the protection scope of the disclosure should be subject to the appended claims.

What is claimed is:

1. An electronic device with a vibration function, comprising:
    a processor, outputting an audio signal according to an application program, and executing an audio analysis module to analyze the audio signal;
    a vibration module, including a first vibrator and a second vibrator, wherein the first vibrator is coupled to the processor and disposed in a left-side position of the electronic device, and the second vibrator is coupled to the processor and disposed in a right-side position of the electronic device; and
    an audio player, coupled to the processor and receiving the audio signal,
    wherein when the audio analysis module determines that the audio signal has a loudness with an audio frequency lower than a default frequency threshold according to an audio frequency distribution of the audio signal, the audio analysis module outputs a vibration drive signal according to the loudness of the audio signal,
    wherein when the audio analysis module determines that the audio signal comprises a left channel signal and that the left channel signal has a first loudness lower than the default frequency threshold according to a first audio frequency distribution of the left channel signal, the audio analysis module outputs a first vibration drive signal to the first vibrator according to the first loudness,
    when the audio analysis module determines that the audio signal comprises a right channel signal and that the right channel signal has a second loudness lower than the default frequency threshold according to a second audio frequency distribution of the right channel signal, the audio analysis module outputs a second vibration drive signal to the second vibrator according to the second loudness.

2. The electronic device according to claim 1, wherein the vibration module is configured to receive the vibration drive signal, and a vibration intensity of the vibration module is positively correlated with the loudness.

3. The electronic device according to claim 2, wherein the audio analysis module drives at least one of the first vibrator and the second vibrator according to the audio signal.

4. The electronic device according to claim 3, wherein the electronic device is a notebook computer, the first vibrator is disposed on a left side of an input module of the electronic device, and the second vibrator is disposed on a right side of the input module of the electronic device.

5. The electronic device according to claim 2, wherein the audio analysis module further determines whether to output another vibration drive signal to the vibration module according to a message signal output by an application program.

6. The electronic device according to claim 1, wherein the audio analysis module further defines whether an external device is located on a left or right side of the electronic device according to an external device setting, so as to determine whether to output the first vibration drive signal or the second vibration drive signal to a third vibrator disposed in the external device.

7. The electronic device according to claim 6, wherein when the left channel signal of the audio signal has the first loudness lower than the default frequency threshold, the audio analysis module defines whether the external device is located on the left side of the electronic device according to the external device setting, so as to output the first vibration drive signal to the third vibrator of the external device according to the first loudness.

8. The electronic device according to claim 6, wherein when the right channel signal of the audio signal has the second loudness lower than the default frequency threshold, the audio analysis module defines whether the external device is located on the right side of the electronic device according to the external device setting, so as to output the second vibration drive signal to the third vibrator of the external device according to the second loudness.

9. The electronic device according to claim 6, wherein the external device is a mouse.

10. A vibration driving method, adapted to an electronic device, comprising:
    outputting an audio signal to an audio player according to an application program;
    executing an audio analysis module to analyze the audio signal;
    determining, by the audio analysis module, whether the audio signal has a loudness with an audio frequency lower than a default frequency threshold according to an audio frequency distribution of the audio signal; and
    outputting, by the audio analysis module, a vibration drive signal according to the loudness of the audio signal, when the audio analysis module determines that the audio signal has the loudness with an audio frequency lower than the default frequency threshold,
    wherein the electronic device comprises a vibration module receiving the vibration drive signal, wherein a vibration intensity of the vibration module is positively correlated with the loudness,
    wherein the vibration module comprises a first vibrator and a second vibrator, and the step of outputting, by the audio analysis module, the vibration drive signal according to the loudness of the audio signal comprises:
    driving, by the audio analysis module, at least one of the first vibrator and the second vibrator according to the audio signal,
    wherein the step of driving, by the audio analysis module, at least one of the first vibrator and the second vibrator according to the audio signal comprises:
    outputting, by the audio analysis module, a first vibration drive signal to the first vibrator according to the first loudness, when the audio analysis module determines that the audio signal comprises a left channel signal and that the left channel signal has a first loudness with a first audio frequency lower than the default frequency threshold according to a first audio frequency distribution of the left channel signal; and outputting, by the audio analysis module, a second vibration drive signal to the second vibrator according to the second loudness, when the audio analysis module determines that the audio signal comprises a right channel signal and that the right channel signal has a second loudness with a second audio frequency lower than the default frequency threshold according to a second audio frequency distribution of the right channel signal.

11. The vibration driving method according to claim 10, wherein the audio analysis module further defines whether an external device is located on a left or right side of the electronic device according to an external device setting, so as to determine whether to output the first vibration drive signal or the second vibration drive signal to a third vibrator disposed in the external device.

12. The vibration driving method according to claim 11, wherein the step of outputting, by the audio analysis module, the first vibration drive signal to the first vibrator according to the first loudness comprises:
when the left channel signal of the audio signal has the first loudness with the first audio frequency lower than the default frequency threshold, defining, by the audio analysis module, whether the external device is located on the left side of the electronic device according to the external device setting, so as to output the first vibration drive signal to the third vibrator of the external device according to the first loudness.

13. The vibration driving method according to claim 11, wherein the step of outputting, by the audio analysis module, the second vibration drive signal to the second vibrator according to the second loudness comprises:
when the right channel signal of the audio signal has the second loudness with the second audio frequency lower than the default frequency threshold, defining, by the audio analysis module, whether the external device is located on the right side of the electronic device according to the external device setting, so as to output the second vibration drive signal to the third vibrator of the external device according to the second loudness.

14. The vibration driving method according to claim 11, wherein the external device is a mouse.

15. The vibration driving method according to claim 10, wherein the electronic device is a notebook computer, the first vibrator is disposed on a left side of an input module of the electronic device, and the second vibrator is disposed on a right side of the input module of the electronic device.

16. The vibration driving method according to claim 10, further comprising:
determining, by the audio analysis module, whether to output another vibration drive signal to the vibration module according to a message signal output by an application program.

17. A vibration driving method, adapted to an electronic device, comprising:
outputting an audio signal to an audio player according to an application program, wherein the audio signal comprises a left channel signal and a right channel signal;
executing an audio analysis module to analyze the left channel signal and the right channel signal;
determining, by the audio analysis module, whether the left channel signal has a first loudness with a first audio frequency lower than the default frequency threshold according to a first audio frequency distribution of the left channel signal, and whether the right channel signal has a second loudness with a second audio frequency lower than the default frequency threshold according to a second audio frequency distribution of the right channel signal;
outputting, by the audio analysis module, a first vibration drive signal according to the first loudness, when the audio analysis module determines that the audio signal comprises the left channel signal having the first loudness with the first audio frequency lower than the default frequency threshold; and
outputting, by the audio analysis module, a second vibration drive signal according to the second loudness, when the audio analysis module determines that the audio signal comprises a right channel signal having a second loudness with a second audio frequency lower than the default frequency threshold,
wherein the audio analysis module further defines whether an external device is located on a left or right side of the electronic device according to an external device setting, so as to determine whether to output the first vibration drive signal or the second vibration drive signal to a third vibrator disposed in the external device.

* * * * *